Sept. 5, 1944.   N. E. HICKIN ET AL   2,357,740
SHOCK ABSORBING MOUNTING FOR INSTRUMENTS AND LIKE PURPOSES
Filed Feb. 10, 1943

Inventors
Norman Ernest Hickin
Wilfred Henry Hogg
Michael Arthur Castle
by Benj. T. Rauber, their Attorney Patented Sept. 5, 1944

2,357,740

UNITED STATES PATENT OFFICE

2,357,740

SHOCK ABSORBING MOUNTING FOR INSTRUMENTS AND LIKE PURPOSES

Norman Ernest Hickin, Castle Bromwich, and Wilfred Henry Hogg and Michael Arthur Castle, Sutton Coldfield, England, assignors to Dunlop Rubber Company Limited, County of London, England, a British company Application February 10, 1943, Serial No. 475,446
In Great Britain March 5, 1942

7 Claims. (Cl. 248—358)

Our invention relates to improvements in shock absorbing mountings for instruments and the like purposes and particularly concerns improvements in mountings of the kind having a rubber element or web which is deformable in shear by central loading of such element substantially at right angles to the general plane of the element.

Mountings of this kind have already been proposed in which the rubber element is produced in the form of a rubber disc which may be apertured and in which the periphery of the disc is bonded to a continuous and rigid annular support such as a ring or flange which may be formed in a sheet metal plate provided with a number of holes for the attachment of said element to the surface of a suitable support.

In order that such mountings may be readily assembled or interchanged with their supports it is necessary to maintain within close limits the positions relative to one another of the holes or other attachment means formed in the metal plates or rings and this necessity involves extremely accurate manufacture with correspondingly increased production costs. Similar difficulties and expense are incurred in maintaining within correspondingly fine limits the positions relative to one another of the holes on the panel or other support or supports to which the mounting is to be secured.

In the improved mounting of our invention the attachment members of the mounting are displaceable relative to one another and to the supporting surface or surfaces so that much wider tolerances are permissible resulting in reduced manufacturing cost due to the reduction or elimination of inspection operations in the manufacture of the metal plates or rings and the support or supports to which they are to be secured. Greater facility is also ensured in the assembly and interchange of the improved mounting upon such supports.

In operation the improved mountings are rendered capable of damping vibration over a wide range although particularly adapted to cushion light loads of the order of four ounces or less, and the load deflection characteristics of the improved mounting may be readily arranged, if desired, to vary in different radial directions for a constant axial loading.

According to this invention we provide a vibration insulating mounting of the kind comprising a rubber element deformable in shear by central loading of the element at right angles to its general plane, wherein the load is sustained by the resistance to deformation of portions of the element which extend outwardly in a radial direction from a central portion to which the load is applied and which are secured at their free edges to a plurality of attachment members spaced apart circumferentially whereby such portions are rendered capable of individual displacement relative to one another.

In order that the invention may be more easily understood and readily carried into effect, the same will now be described with reference to the accompanying drawing in which.

Figure 1:
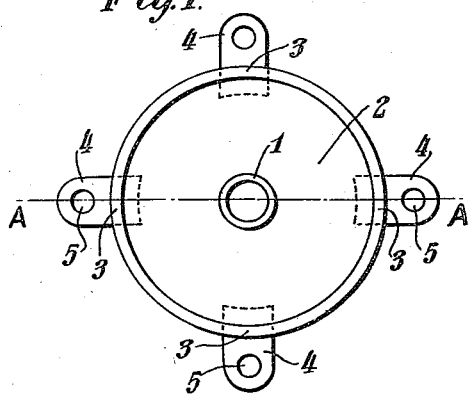
Fig. 1 is a plan view of one form of mounting constructed in accordance with the invention.

Referring to the drawing the improved mounting comprises a central metal sleeve 1 for the application and location of the load, which sleeve is bonded to the web or central portion of a rubber element 2 which is deformable in shear by application of the load to the metal sleeve.

Peripheral portions 3 of the web 2 are secured at circumferential intervals to the inner ends of a plurality of metallic attachment members 4, the free edges of which members project beyond the periphery of the rubber web for attachment to a support or supports, not shown.

The outer ends of the attachment members 4 may be apertured as shown at 5 for attachment to such supports or may be provided with other convenient attachment devices such as a plate carrying a screw or rivet, or a plate formed with a bayonet type slot the enlarged part of which is disposed adjacent the rubber element.

The attachment members shown are in the form of metal plates lying substantially in the general plane of the rubber element, such plates however, may be replaced for light loads by metal pins the inner ends of which are embedded in the element and the outer ends of which are bent to constitute hooks or eyelets securable to pins or screws inserted in the support or supports.

The peripheral portions 3 to which the inner ends of the attachment members are bonded are preferably formed of deeper section as shown more clearly in the sectional views, the upstanding surfaces thus provided affording a snubbing action in the case of overload.

Figure 3:
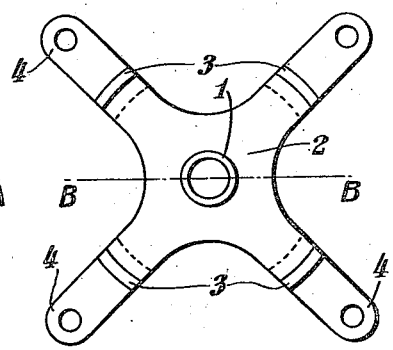
Fig. 3 is a plan view of another form of mounting constructed in accordance with the invention.
Figure 2:
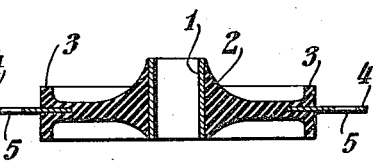
Fig. 2 is a sectional view on the line A—A of Fig. 1.
Figure 4:
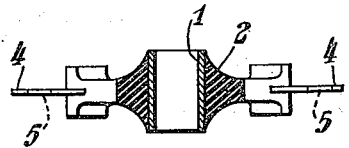
Fig. 4 is a sectional view on the line B—B of Fig. 3.

The construction shown in Figs. 3 and 4 of the drawing is intended more particularly for light weight loads and these portions 3 of the element 2 which are secured to the attachment members 4 are moulded with re-entrant parts between them so as to yield more readily to deflection than in the previous construction wherein the portions form parts of an element of uniform diameter.

If desired, several elements which have two or more outwardly projecting peripheral portions in the same plane may be bonded to a common central sleeve such portions extending in parallel or non-parallel planes and being provided with attachment members as described above.

Figure 5:
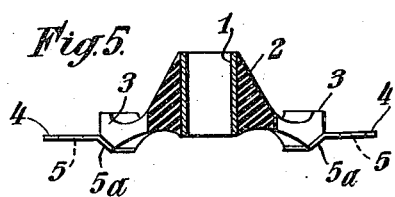
Fig. 5 is a sectional view of a third form of mounting constructed in accordance with the invention.

In the construction shown in Fig. 5 the deformable element 2 is moulded with a web of conical formation portions of which web are bonded to attachment members 4 having inclined bonding surfaces 5a.

It will also be understood that instead of embedding the attachment members as shown in Figs. 1 to 4 we may bond the edges of the portions 3 to vertical toe parts formed on each of the respective attachment members 4.

Having described our invention—what we claim is:

1. A vibration insulating mounting for instruments comprising a rubber element deformable in shear by central load of the element at right angles to its general plane and having a central yielding portion and load sustaining portion extending outwardly in a radial direction from said central yielding portion of the element to which the load is applied, attachment members spaced apart circumferentially and secured to the outer edges of said load sustaining portion whereby such members are rendered capable of individual displacement relative to one another.

2. A mounting according to claim 1 wherein said portion is circumferentially separated by re-entrant recesses and the outer ends of said separated portions are bonded to metallic attachment members.

3. A mounting according to claim 1 wherein said portion is circumferentially separated by re-entrant recesses and the outer ends of said separated portions are bonded to metallic attachment members wherein said portions extend outwardly from the central portion in different planes.

4. A vibration insulating mounting for instruments comprising a molded element of resilient material deformable in shear by a load centrally applied at right angles to the general plane of the molded element, said element having a central load holding portion and a yieldable load sustaining portion extending radially outwardly therefrom and securing elements embedded at the outer edge of said radially extending portion at spaced circumferential intervals.

5. A vibration insulating mounting for instruments which comprises a central element of resilient rubber composition having means at its center for mounting an instrument and having load sustaining resilient arms extending radially outwardly therefrom and an attachment member for each of said arms secured to the outer edge thereof.

6. The mounting of claim 5 in which the outer edges of said arms are flanged to provide an increased thickness at the ends of said arms.

7. The mounting of claim 5 in which said arms lie in a conical plane about the center of said mounting.

NORMAN ERNEST HICKIN.
WILFRED HENRY HOGG.
MICHAEL ARTHUR CASTLE.